Jan. 27, 1925.

G. CONWAY 1,524,020

SAND AND GRAVEL PLANT

Filed Dec. 31, 1923   6 Sheets-Sheet 5

INVENTOR.
George Conway.
By
Lacey & Lacey, Attorneys

Patented Jan. 27, 1925.

1,524,020

UNITED STATES PATENT OFFICE.

GEORGE CONWAY, OF BOWIE, MARYLAND.

SAND AND GRAVEL PLANT.

Application filed December 31, 1923. Serial No. 683,817.

*To all whom it may concern:*

Be it known that I, GEORGE CONWAY, a citizen of the United States, residing at Bowie, in the county of Prince Georges and State of Maryland, have invented certain new and useful Improvements in Sand and Gravel Plants, of which the following is a specification.

My invention relates to apparatus for extracting sand and gravel from the earth and its primary object is to provide a portable plant by the operation of which the sand and gravel may be dug from the ground and automatically delivered to a screening mechanism for grading and storage or delivery to vehicles for transportation. The invention seeks to provide a plant which may be economically operated and will require few workmen for its successful use, and the invention also seeks to provide a mechanism of strong and durable construction without complicated arrangements of parts whereby an excavating bucket may be mechanically manipulated to extract the sand and gravel from a pit and elevated and automatically caused to discharge its load for delivery to the screen and grading mechanism. Other objects of the invention will appear incidentally in the course of the following description, and all of said objects are attained in such an apparatus as is illustrated in the accompanying drawings. The invention resides in certain novel features which will be particularly pointed out in the appended claims.

Figure 5:
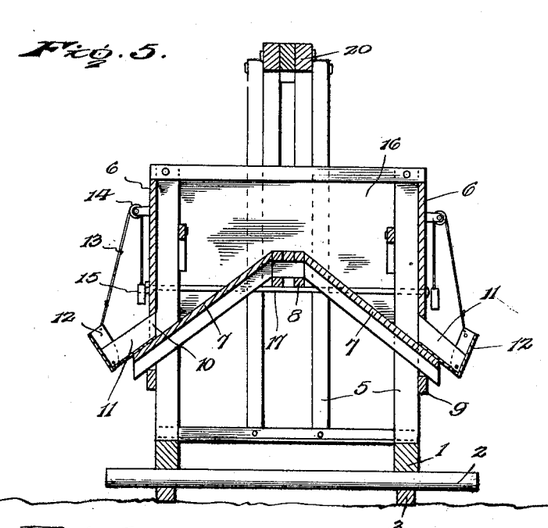
Fig. 5 is a detail transverse section on the line 5—5 of Fig. 4.

In the illustrated embodiment of my invention, the main frame comprises a base 1 which may be of any convenient form and dimensions and will generally be in the form of metal sills or beams connected by transverse beams so as to produce a strong, rigid and durable structure. In use, this base rests upon rollers 2 which, in turn, are placed upon flat rails 3 deposited in proper position at the pit or adjacent the point where the gravel and sand is to be dug. Wedges 4 are engaged between the said rails and the front and rear ends of the base so as to firmly hold the base in position during the operation of the plant, but, if the plant is to be moved to accommodate the progress of the work, the wedges 4 are removed and the entire apparatus is shifted longitudinally, the rollers 2 rotating to facilitate the shifting. Posts or standards 5 are erected at intervals upon the beams or base 1 and plates or boards 6 are secured upon the sides of these posts or standards so as to form an encloed storage receptacle. A floor 7 is supported by the said posts and by a central longitudinal beam 8 extending between the ends of the structure and also by beams 9 secured upon the sides of the standards. The floor 7, as shown most clearly in Fig. 5, is formed in two sections diverging downwardly from the central beam 8 and extending through openings 10 provided at intervals in the side plates 6. Chutes 11 are supported upon the projecting edges of the floor 7 and have their inner ends fitted closely within the openings 10 so that the material flowing down the floor through the said openings will be caught and retained in the chutes. Each chute is provided with a gate or cut-off 12 pivoted thereto and adapted to extend upwardly across the lower end of the chute, as shown in Fig. 5, so as to cut-off the flow. If the gates be lowered so as to extend in alinement with the bottoms of the chutes, the sand or gravel within the storage receptacle may flow therefrom into a car or other vehicle positioned to receive the same. To the free end of each gate is secured one end of a cable or its equivalent 13 which extends upwardly to and over a guide roller 14 on the wall or side plate 6 and then downwardly between the said roller and the said wall, the free end of this cable carrying a counterweight 15, as shown in the drawings. Normally, the weight serves to hold the gate in its raised position so as to cut-off the flow but, when it is desired to deliver some of the sand or gravel, the gate is swung downwardly and the weight of the material flowing over the same will then hold it in the open position against the action of the counterweight. When the desired quantity of the material, however, has been withdrawn, a slight upward push upon the gate will return it to the closed position.

Transverse partitions 16 are secured between the side walls of the storage receptacle and thereby divide said receptacle into a plurality of storage bins, as will be readily understood.

Tie rods 17 are extended through the storage receptacle so as to thoroughly brace the same and additional rigidity is imparted to the structure by bracing, indicated at 18, connecting the base 1 with the standards, it being understood that this bracing may be given any desired form which will provide the necessary strength. Above the several bins, I support upon the end bars 19 and the upper edges of the partitions 16, beams or sills 20 which are inclined slightly from the front to the rear, and upon these beams I mount the rotary screen 21 which is preferably a cylinder having its wall of wire mesh or perforated material increasing in coarseness from the receiving end to the discharge end whereby the material delivered into the screen will be graded and delivered into the several bins successively as it passes from the several sections of the screen. The particular form of screen illustrated includes a supplemental screen 22 arranged concentric with and in spaced relation to the receiving end of the screen so that the very fine material may be excluded from the material permitted to pass into the bins. A hopper or chute 23 is provided immediately below this supplemental screen 22, and a trough or chute 24 leads transversely from the said hopper or chute to one side of the plant so that the valueless material caught by the said trough or chute may be deposited upon the ground at one side of the machine. The screen is driven from a motor 25 supported in any convenient manner upon one end of the frame and connected therewith through suitable gearing, indicated at 26.

Figure 3:
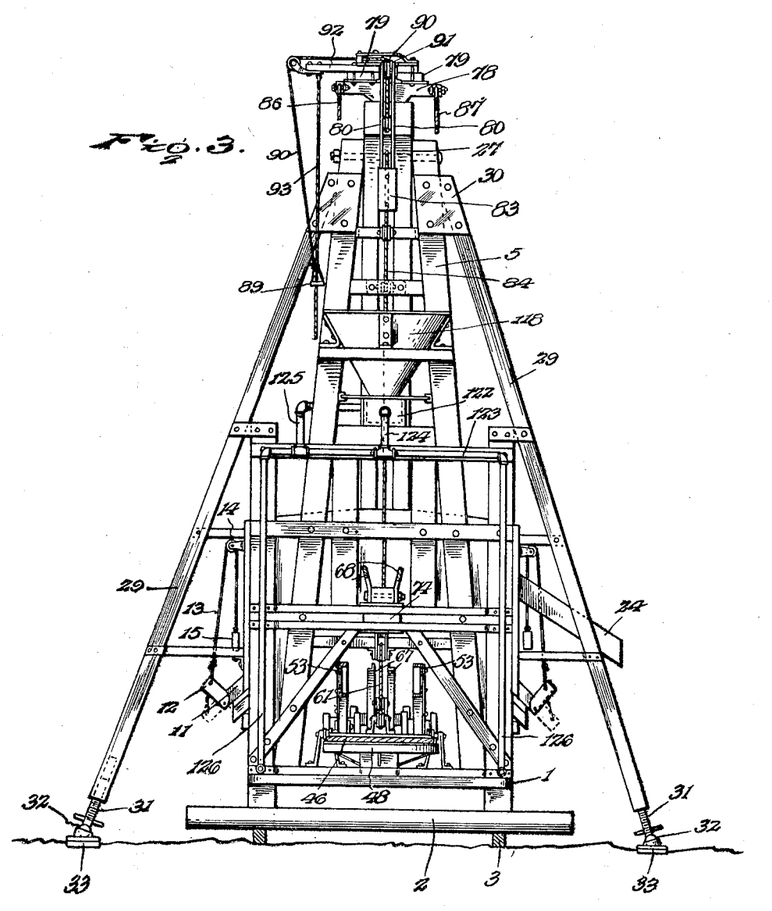
Fig. 3 is a view, partly in end elevation and partly in transverse section, on the line 3—3 of Fig. 1.

Some of the posts or standards 5 at the ends of the structure are extended above the screening and grading mechanism, and the upper ends of these standards are connected by inclined braces 27, the upper forward ends of said braces extending beyond the ends of the front standards so as to provide a firm support for a bearing sleeve 28. Lateral braces 29 are connected by gusset plates 30 at their upper ends with the adjacent standards or posts 5, and these braces 29 diverge downwardly and are adapted to engage the ground at the sides of the apparatus, as shown clearly in Fig. 3. While the plant may be maintained in place with sufficient rigidity by permitting the lower ends of these braces to rest directly upon the ground, I prefer to provide jack screws 31 which are engaged in the lower ends of the braces and are connected by universal joints or ball and socket joints 32 with anchor plates 33. By suitably adjusting the jack screws, the braces may be so arranged as to support the main structure in an upright position notwithstanding irregularities of the surface of the ground at the sides or in the bottom of the pit.

Figure 1:
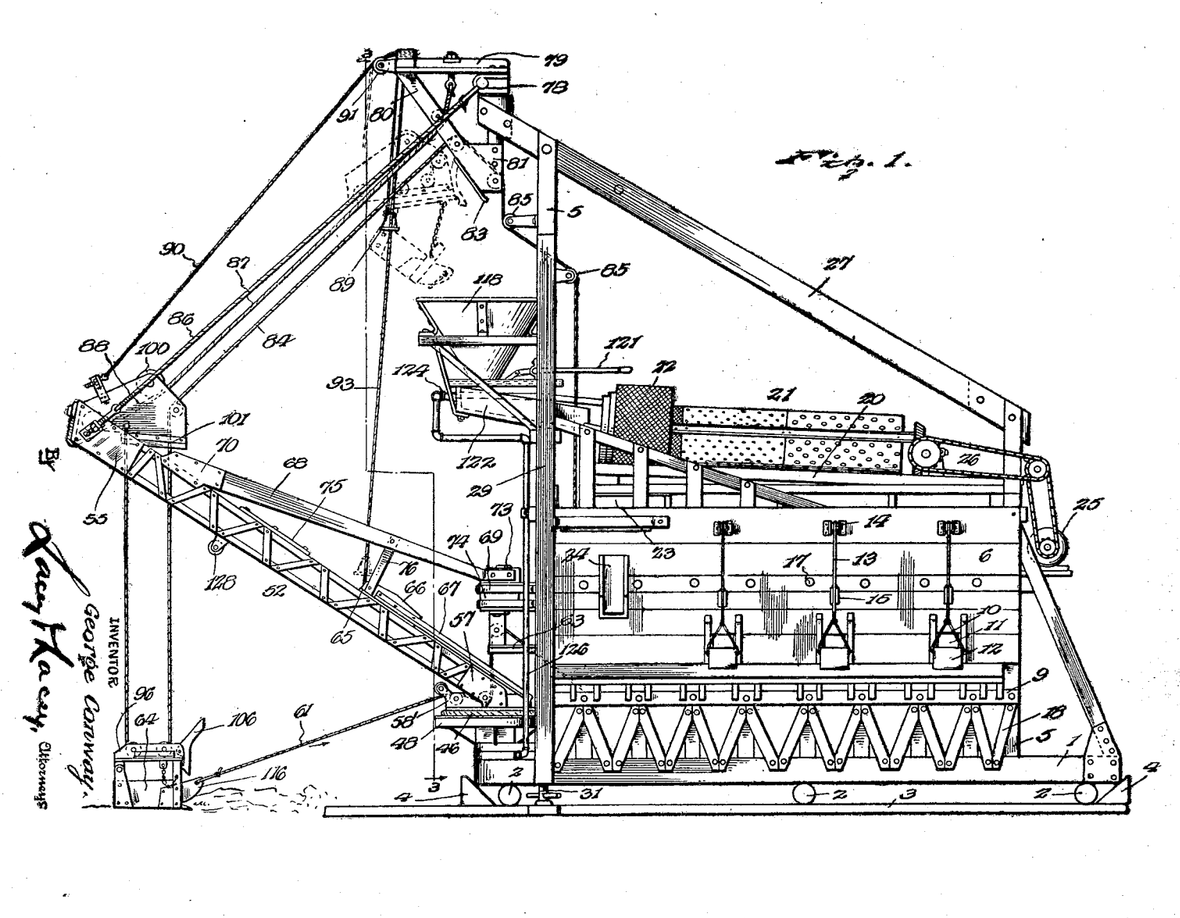
Figure 1 is a side elevation of a plant embodying my improvements.
Figure 2:
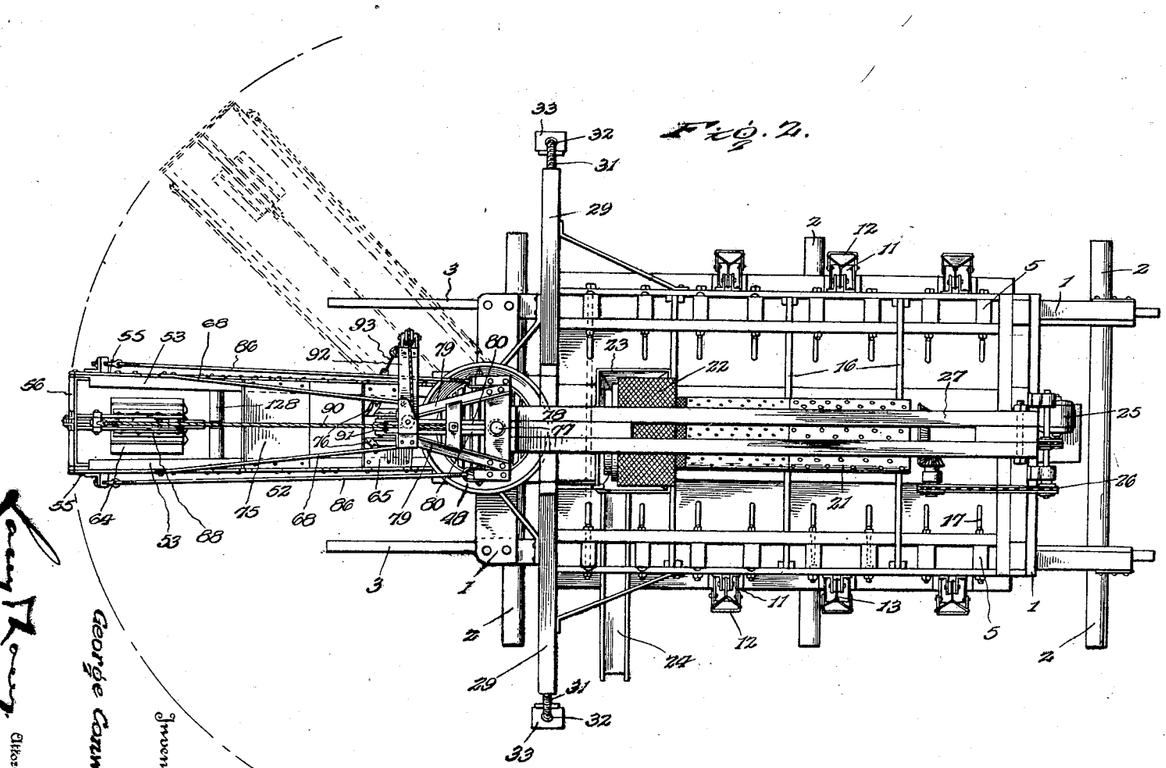
Fig. 2 is a plan view of the same.
Figure 4:
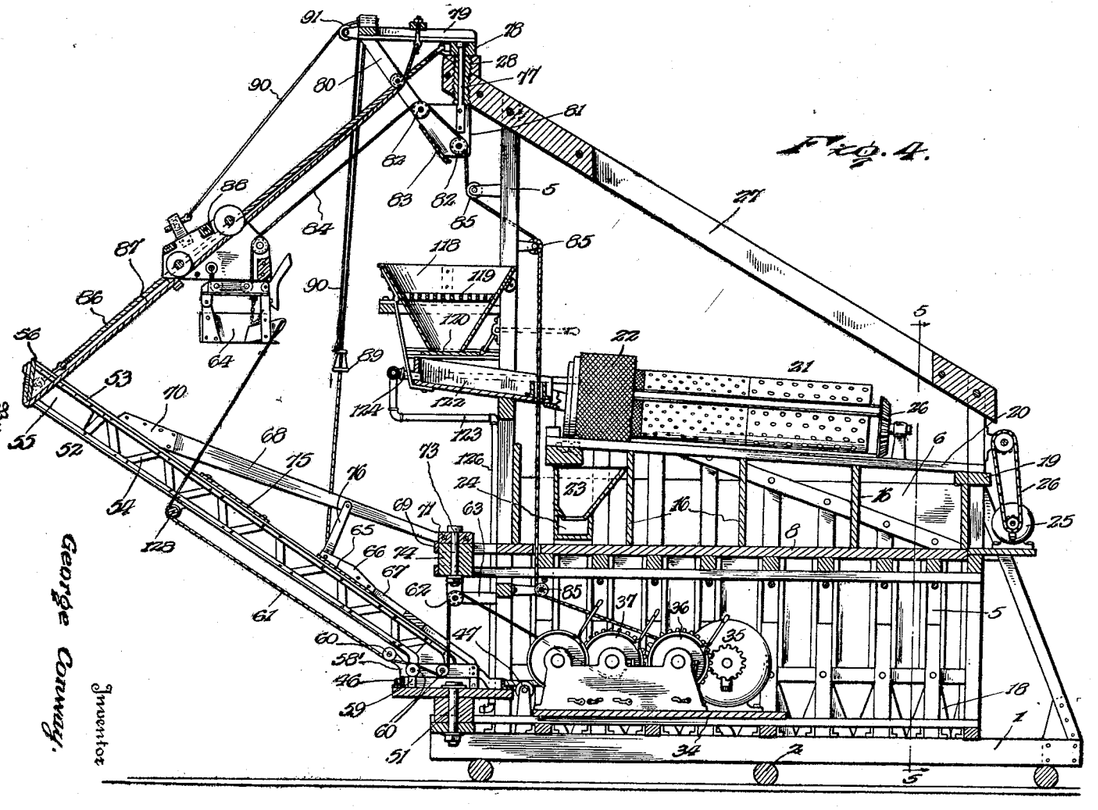
Fig. 4 is a central longitudinal vertical section of the apparatus.
Figure 6:
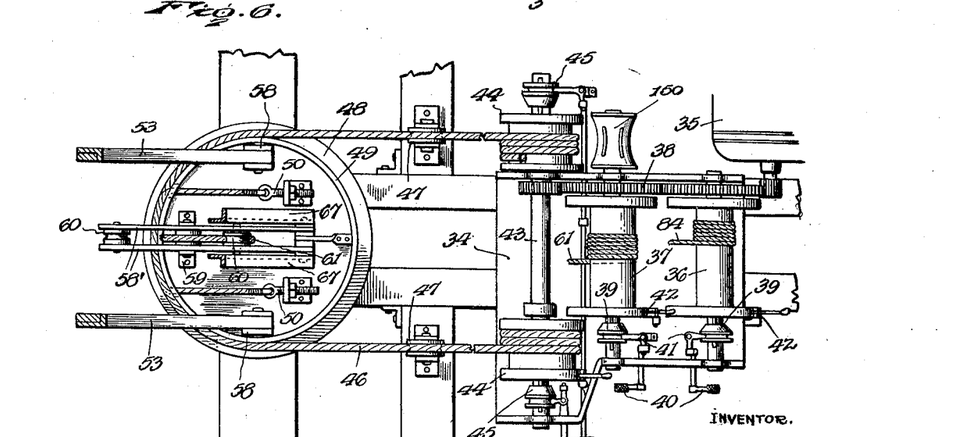
Fig. 6 is a view, partly in horizontal section and partly in plan, of a portion of the operating mechanism.

Upon the base 1 adjacent the front end thereof is a platform 34 upon which is mounted a motor 35 and drums 36 and 37 which are operatively connected through suitable gearing, indicated at 38, with the motor so as to be driven thereby. It will be understood that the drums 36 and 37 are loosely mounted upon their respective axles or shafts and are locked to the shafts so as to be rotated therewith by clutches 39 which may be of any preferred form and controlled through any suitable means, the drawings showing treadles 40 connected by rock shafts and pitmen with angle levers 41 directly engaged with the clutches. I also prefer to provide brake bands 42 whereby the rotation of these drums may be arrested when necessary. I also provide a boom-swinging mechanism consisting of a shaft 43 suitably mounted upon the platform 34 and geared to the motor 35. Upon the ends of this shaft 43 are mounted drums 44 adapted to be locked thereto by clutches 45. Wound about these drums are cables 46 which extend therefrom over suitable idlers 47 to a turntable 48, the ends of the cables being extended around the vertical rim 49 of the turntable and anchored thereon at opposite sides of the center thereof, as shown at 50. Obviously by locking either drum 44 to its shaft and rotating the shaft, the turntable may be swung in either direction. The turntable is rotatably fitted about the upper end of a king bolt 51 which is secured in the base of the structure, and a boom 52 is secured upon and rises upwardly and forwardly from the turntable. This boom may be of any suitable detail form and is illustrated as consisting of pairs of angle bars 53, the members of each pair being braced by tie plates 54, the outer ends of the members of each pair being rigidly connected by side gusset plates 55, and the ends of the two pairs being joined by a cross plate 56, a very rigid structure being thus produced. The lower ends of the boom members 53 are reinforced by gusset plates 57 and are pivotally secured to brackets or lugs 58 provided upon the turntable. Ordinarily, the boom will be rigid relative to the turntable, but if it be desired to ship the plant or for any reason it is desired to economize space, the bracing connections presently mentioned are disconnected and the boom is then swung into substantially vertical position close to the main structure. Secured rigidly upon the upper side of the turntable upon a diameter of the same midway between and parallel with the side members of the boom is a cable-guiding device consisting of side plates 58' resting upon feet or brackets 59. The plates 58' are, of course, parallel, as shown in Fig. 6, and a series of idlers or guide rollers 60 is mounted between them to support and guide the hauling or pulling cable 61. From the rearmost idler 60, the cable is carried upwardly to and over a guide roller 62 and thence to the drum 37, as shown in Fig. 4. The idler 62 is supported by brackets 63 on the front end of the supporting structure and is disposed in vertical alinement with the king bolt 51. The outer end of the cable 61 is connected with the excavating bucket 64 which will be presently more particularly described. Adjacent the lower end of the boom, the side members thereof are connected by a bracing plate 65 secured rigidly upon the upper sides of the said members and secured to a central block 66 carried by the said plate are the upper ends of braces 67, the said braces 67 extending downwardly and being secured at their lower ends to the rear ends of the plates or rails 58. The lower end of the boom is thus additionally reinforced and braced and, to further support the boom, bracing rails 68 are extended between the boom and a projecting support 69 on the main structure. The outer ends of these bracing rails or beams 68 are connected by gusset plates 70 with the side members of the boom adjacent the outer ends thereof, as shown clearly in Figs. 1 and 4, and the inner ends of the said bracing members are secured to a head or block 71 which is rotatably fitted about the upper end of a king bolt 73 secured through a bearing block 74 which is carried by the projecting arm or support 69 on the front side of the main frame. A connecting plate 75 may be also secured to and extend between the upper edges of the sides of the boom so as to further reinforce the same, and short props 76 are secured to and extend between the block 66 and the bracing beams 68, as shown in Figs. 1 and 4, so that a very firm support for the boom is provided. The king bolt 73 is, of course, alined vertically with the king bolt 51 so that the turning movement of the boom and of the bracing connections will be concentric. The reinforcing structure consisting of the members 67 and 68 and the connections between the same and the boom impart great strength to the boom so that it will resist very high strains and any tendency of the boom to drop under the strains imposed thereon will be positively and effectually overcome. At the same time, the boom may be easily brought into a position substantially upright and close to the main frame by disconnecting the members 68 and 67 and then swinging the boom upwardly, as will be understood.

A king bolt 77 is mounted rotatably in the bearing sleeve 28 at the upper ends of the braces 27 and is disposed in axial alinement with the king bolts 51 and 73. To the upper end of this bolt 77 is secured a head 78, and forwardly projecting arms 79 are, in turn, secured upon the said head. Bracing links 80 are secured to the outer front ends of these arms 79 and extend downwardly and rearwardly therefrom to carry plates 81 which are rigidly secured to the lower end of the bolt 77, as shown clearly in Fig. 4. Guide pulleys or rollers 82 are fitted between the plates 81, and a strike plate or trip 83 is carried by the front edges of said plates and the lower ends of the bracing links 80. The lifting cable 84 is trained about the guide rollers 82 and thence past other suitable guide rollers 85 to pass to the drum 36 about which it is wound. Extending between the head 78 and the outer free end of the boom are guy cables 86 which serve to further reinforce the boom and maintain a fixed relation between the end of the same and the said head 78 while disposed midway between the guy cables 86 is a track cable 87 having its ends secured, respectively, to the end of the boom and to the arms 79. The securing devices of all these cables are preferably adjustable bolts so that the cables may be tightened from time to time to compensate for wear and possible stretching and maintain the operative condition of the same. A carriage 88 is arranged to travel along the track cable 87 between the guy cables 86 from the end of the boom to the bracing links 80 in the operation of the apparatus, and in order that the operator stationed adjacent the motor 35 and the drums 36 and 37 may be advised as to when the carriage reaches the upper limit of its movement, I provide a signal consisting of a sleeve or block 89 of any convenient style carried by a cable 90 which is secured to the carriage 88 and passes from the carriage to a guide pulley 91 at the outer ends of the arms 79 and thence about suitable guide pulleys carried by a laterally extending bracket 92 which is secured to and projects laterally from the arms 79 whereby the signal block 89 will be supported in a pendent position below the outer end of the said bracket. A guide for the signal block is provided in the form of a cable 93 which is extended between the arm 92 and the side of the boom so that the lateral swaying of the signal block will be prevented, the guide being sufficiently flexible to yield to the relatively lateral movement of the block as it is carried up or down. Obviously, when the carriage is in its lowest position shown in Fig. 1, the signal block will be in its highest position and as the carriage is moved upwardly the signal will descend until, when the carriage reaches its highest point, the signal will be adjacent the boom and may be easily seen by the operator who will then, of course, arrest the movement of the elevating drum. The elevating cable 84 is secured at one end 94 to the carriage 88 and is then trained about idlers or guide rollers 95 at the upper side of the bucket carrier 96 which constitutes the main support for the bucket 64. After leaving the idlers 95, the cable 84 is carried upwardly through the carriage to and about a guide roller 97 and thence passes upwardly to the roller 82, as previously described.

Figure 7:
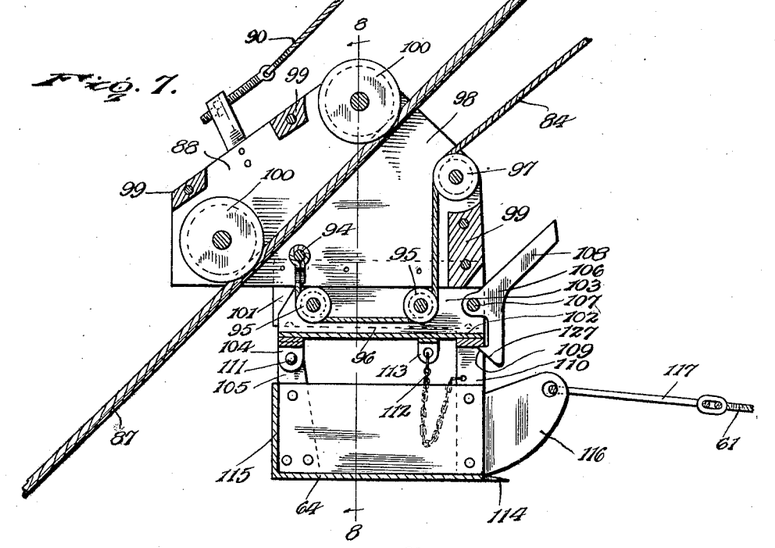
Fig. 7 is a longitudinal section of the bucket and the carrier for the same.
Figure 8:
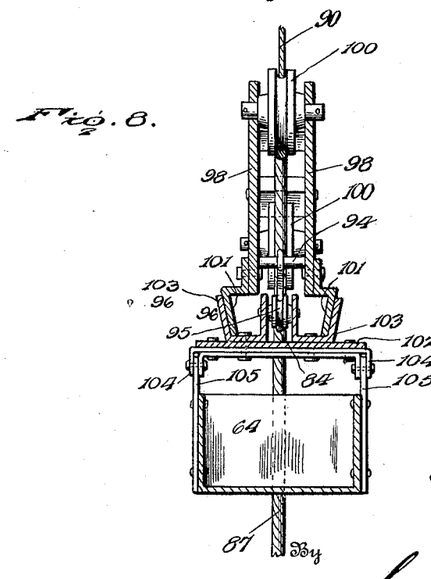
Fig. 8 is a detail section on the line 8—8 of Fig. 7.

The carriage consists of two stout cheek plates 98 rigidly secured together by suitable transverse bolts and spacing blocks, as indicated at 99, and between the upper portions of these cheek plates are mounted the supporting rollers 100 which travel upon the track cable 87, as shown most clearly in Fig. 7. To the outer sides of the cheek plates at the lower edges thereof, I secure members 101 which extend laterally outwardly from the cheek plates and then downwardly in slightly converging relation, as shown clearly in Fig. 8. The bucket carrier 96 comprises a plate 102 upon the upper side of which I secure the channel members 103, the outer flanges of which are adapted to engage against the outer faces of the members 101 so that, when the bucket has been raised to the carriage, the said engaging members 103 will span the members 101 of the carriage and the continued pull upon the lifting cable will then cause the carriage to travel upwardly along the track cable 87, as will be readily understood upon reference to Fig. 7 and the dotted lines in Fig. 1. The inner upstanding flanges or webs of the engaging members 103 constitute supports for the idlers 95 and define a channel or passageway in which the lifting cable 84 may travel. At its front end, the plate 102 of the carrier is provided with depending lugs 104 to which are pivotally attached the upper ends of lugs 105 on the sides of the bucket 64, while at the rear end of the bucket carrier is pivotally mounted a trip latch 106, the pivot 107 for the said trip latch extending through the space between the inner flanges or webs of the engaging members 103. The latch is so formed as to present an upwardly projecting trip arm 108 adapted in operation to impinge against the strike plate 83 when the carriage reaches the upper limit of its movement, while the lower end of the trip latch is disposed at an angle to the upper end and formed with a shoulder or hook 109 adapted to engage under a yoke or bail 110 at the rear end of the excavator bucket. When the hook or shoulder 109 engages the said yoke or bail, as shown in Fig. 7, the bucket will be held to the carrier and will, consequently, support the load but when the latch is released the bucket will swing downwardly about the pivot 111 and discharge the load. To limit the downwardly swinging movement of the bucket, a chain or other flexible stop device 112 is provided, one end of this device being secured to the bail or yoke 110 and the other end thereof being secured to a lug or bracket 113 on the under side of the plate 102. The bucket is provided at its working end with excavator teeth 114, while its opposite end is closed, as shown at 115. Draft plates or clevises 116 are secured to the sides of the bucket at the working end thereof and connected through links or other devices 117 with the pull cable 61.

Supported upon the main frame below the uppermost turntable structure, which includes the plates 81 and the strike plate 83, is a hopper 118 which is preferably of an inverted conical form and is provided with a screen or grate 119 near its upper open end. A gate or slide valve 120 is provided at the lower end of this hopper and may be adjusted by a hand lever 121 so that the material deposited in the hopper will be permitted to pass to the screening mechanism in a layer or stream of uniform depth. Immediately below the hopper is a chute or trough 122 which leads to the receiving end of the screening mechanism 21. A water pipe 123 is provided upon the front end of the main frame and has a terminal 124 fitted in the upper end of this chute or trough 122. Another branch 125 of the pipe leads around the trough to discharge into the receiving end of the screen 21 and upon reference to Fig. 3, it will be noted that the pipe 123 has a vertical member 126 at each side of the apparatus. In actual practice, a hose is employed to connect one of the side members 126 with a pump or other source of supply and by providing the members 126 in duplicate, the hose may be connected at either side as may be most convenient under any given circumstances.

In the use of the apparatus, the bucket is lowered to such a point that the teeth 114 thereon will dig into the bottom of the pit or the surface of the ground and the drums 36 and 37 are set so that the pull rope 61 will be wound while the lifting cable 84 will be paid out. The bucket will thus be drawn along the ground or the bottom of the pit toward the main frame and will readily take up a load of material. When the bucket is loaded, the drums are reversed so that a pull will be exerted upon the lifting cable and the hauling or pull cable 61 will be permitted to pay out. The bucket will, consequently, be raised and the carrier 96 will be brought into engagement with the bottom of the carriage 88, whereupon the continued pull upon the lifting cable will cause the carriage to travel upwardly along the track cable 87 and eventually the trip latch will be caused to impinge upon the trip plate 83 so that it will be released from the bail or yoke 110 and the bucket will be permitted to swing downwardly and discharge its contents into the hopper 118, as will be readily understood on reference to the dotted lines in Fig. 1. The drums are then again reversed so that the carriage will be lowered and the bucket brought back to the ground. When the bucket strikes the ground, it will, of course, be swung upwardly and the latch 116 will be again caused to engage the bail or yoke 110, the lower extremity of the latch being beveled, as shown at 127, to facilitate such engagement. When the carriage and the bucket are raised, the line followed by the pull cable will, of course, be varied and, to prevent the said cable becoming entangled with any of the other parts and also to avoid excessive wear upon the cable through contact with some of the other parts, a guide roller 128 is provided on the under side of the boom at a proper point, as shown in Figs. 1 and 4, so that the cable will be held out of wearing contact with the stationary parts when the bucket is raised. The material discharged into the hopper 118 will, of course, gravitate into the trough 122 and will thence pass into the screening cylinder 21. The water discharged into the trough will serve to thoroughly wash the dirt and loam from the gravel and valuable sand, and this valueless dirt and exceedingly fine material will be forced through the screen 22 into the hopper 23 and thence pass out to drop onto the ground at the side of the scene of operations. The fine gravel will escape into the first bin over the rear end of the supplemental screen 22 and also through the finest perforations or mesh of the cylinder 21, while the successively coarser material will be deposited in the successive bins, as will be readily understood. By the use of my apparatus, the sand and gravel are dug from the ground, lifted therefrom and delivered to the screening mechanism in a continuous automatic process by an apparatus which is a single unit. The material stored in the several bins may be easily withdrawn therefrom as desired by manipulation of the controlling gates, as before described. The swinging mounting of the boom and the parts cooperating therewith permits the bucket to be set to work at the center of the pit or at either side of the same and also facilitates the removal of the waste material which often has to be removed before the gravel is reached. In removing this waste material, the boom is swung to one side so that the bucket will be brought into position over the ground at one side of the pit and an attendant will be stationed there to trip the bucket so that the waste material may be dumped in a pile.

Ordinarily, it will not be necessary to move the apparatus forwardly after it is set up but, if it should be necessary to so move it, the front wedge 4 is removed and the jack screws 31 are also lifted out of place. The bucket is caused to effect an anchoring engagement with the ground and a pull is then exerted upon the pull cable 61, as result of which action the entire apparatus will move forwardly over the rollers 2. In the usual operation of the plant, the gravel and sand are removed to the desired depth at one point in the pit and the plant is then moved backwardly so as to bring the bucket into position to operate at another successive point in the pit. To effect this travel or adjustment, a separate cable is provided and attached to a drum 150, being carried rearwardly therefrom to the desired distance and secured to any convenient anchor. A few turns of the drum will coil the cable sufficiently to effect the desired travel as, ordinarily, the plant is shifted only about twenty feet at a time. The machine operates on the ground level ordinarily and digs the material from below, it being possible with the apparatus built by me to dig to any depth within fifty feet. If there happens to be water in the pit, the bucket will operate efficiently notwithstanding that fact and the moisture in the material taken up will aid in washing it after it has been discharged into the hopper 118.

Having thus described the invention, I claim:

1. In a sand and gravel plant, an excavating bucket, means for causing the bucket to take up a load, a carriage mounted above the bucket, means for lifting the bucket into engagement with the carriage and effecting travel of the carriage and the bucket to a point of discharge, and a signal connected with the carriage to travel simultaneously therewith and indicate the position of the carriage.

2. In a sand and gravel plant, an excavating bucket having one open end and pivotally supported at its closed end, a trip engaging the open end of the bucket and normally holding it in load-supporting position, means for causing the bucket to take up a load, means for elevating the trip-held bucket and carrying it to a point of discharge, and a trip plate arranged in the path of the trip at the point of discharge whereby to release the trip and cause the bucket to tilt upon its pivot and discharge its load.

3. In a sand and gravel plant, an excavating bucket, means for causing the bucket to take up a load, a carrier releasably connected with the bucket and normally sustaining the same, a carriage arranged above the carrier, means connected to the carriage and engaged with the carrier for lifting the carrier and the bucket to the carriage and moving the carriage the carrier and the bucket to a point of discharge, and means at the point of discharge to automatically tilt the bucket upon the carrier to discharge the load.

4. In a sand and gravel plant, an excavating bucket, a carrier to which the bucket is pivotally attached at one end, a trip latch normally holding the opposite end of the bucket to the carrier, a carriage disposed above the bucket, means for causing the bucket to take up a load, means for lifting the bucket and the carrier into contact with the carriage and for effecting travel of the carriage, and a trip plate disposed at one limit of the travel of the carriage in the path of the trip whereby to actuate the trip and release the bucket whereby to discharge the load.

5. In a sand and gravel plant, an excavating bucket, a carrier therefor having a pivotal connection with one end of the bucket, a trip latch normally holding the opposite end of the bucket to the carrier, a carriage arranged above the bucket and the carrier, engaging members on the carriage and the carrier, means for lifting the carrier and the bucket into engagement with the carriage and causing travel of the carriage, and means at one limit of movement of the carriage for releasing the bucket from the carrier to discharge the load.

6. In a sand and gravel plant, a supporting structure, a turntable mounted thereon, a boom carried by the turntable, a hopper upon the supporting structure above the said turntable, an upper turntable mechanism mounted upon the main supporting structure above the hopper, a track extending between the free end of the boom and the said upper turntable structure, a carriage mounted to travel on said track, a bucket arranged to operate below the boom, means for causing the bucket to take up a load, and means for lifting the bucket into engagement with the carriage and effecting travel of the carriage to the upper turntable structure.

7. In a sand and gravel plant, a main supporting structure, a turntable upon the lower portion of said structure, a boom secured to said turntable, an intermediate turntable mounted upon the main supporting structure above the first-mentioned turntable and in vertical alinement therewith, a brace extending between said intermediate turntable and the outer portion of the boom, an upper turntable device mounted in the upper end of the main supporting structure in vertical alinement with the previously mentioned turntables, a track extending between the upper turntable device and the free end of the boom, a carriage mounted to travel on said track, an excavating bucket, means for causing said bucket to take up a load, means for lifting the bucket into engagement with the carriage and effecting travel of the carriage, and means on the upper turntable device for effecting discharge of the bucket.

8. In a sand and gravel plant, a main supporting structure, a turntable mounted thereon, a boom carried by the turntable and pivotally attached thereto for movement in a vertical plane, a bracing element secured to the boom and adapted to be rigidly secured to the turntable whereby to normally resist the pivotal movement of the boom, a second turntable mounted on the main supporting structure above the first-mentioned turntable, and a bracing element fitted to the second-mentioned turntable and connected rigidly to the boom.

9. In a sand and gravel plant, an excavating bucket, a carrier therefor having a pivotal connection therewith at one end, a trip on the carrier normally engaging the opposite end of the bucket to hold it in load-supporting position, upstanding guides extending longitudinally of the carrier, a carriage mounted above the carrier, depending guides extending longitudinally of the carriage to mate with the guides on the carrier, means for causing the bucket to take up a load, means for lifting the carrier to the carriage and causing the carriage to travel to a point of discharge, and means at the point of discharge to release the trip whereby to tilt the bucket and discharge the load.

10. A sand and gravel plant comprising a supporting structure, a boom extending therefrom, a carriage mounted to travel between the free end of the boom and an upper part of the supporting structure, an excavating bucket, a hauling cable attached to the bucket and extending therefrom to the supporting structure, a carrier to which the bucket is pivoted, a trip normally holding the bucket to the carrier in load-supporting position, a lifting cable secured at one end to the carriage and extending therefrom to and through the carrier thence back to and through the carriage and thence to the supporting structure whereby to lift the carrier and the bucket to the carriage and cause travel thereof to a point of discharge, and means at the point of discharge to release the trip and permit the bucket to tilt and discharge the load.

In testimony whereof I affix my signature.

GEORGE CONWAY. [L. S.]